Sept. 28, 1926.

C. E. WIDMEYER 1,601,093

BUSHING FOR PIPE JOINTS

Filed May 1, 1924

INVENTOR
C. E. Widmeyer
BY Denison & Thompson
ATTORNEYS

WITNESS

Patented Sept. 28, 1926.

1,601,093

UNITED STATES PATENT OFFICE.

CHARLES E. WIDMEYER, OF BEAVER FALLS, NEW YORK, ASSIGNOR TO HARRY S. LEWIS, OF BEAVER FALLS, NEW YORK.

BUSHING FOR PIPE JOINTS.

Application filed May 1, 1924. Serial No. 710,284.

This invention relates to steam pipe connections as used more particularly in connection with elbow fittings of steam distributing systems.

The threads for these fittings are usually cut rather deep leaving the stock at the base of the threads relatively thin as compared with the unthreaded portions of the pipe so that after a short period of use, the corrosion and erosion, particularly at the side of the elbow opposed to the direction of flow of the steam or other fluid causes disintegration of that portion of the pipe and consequent leakage of steam at the adjacent portion of the threaded joint which necessitates frequent replacements for that particular pipe section.

The main object of my invention is to avoid this disintegration of the threaded portion of the pipe section at its junction with the elbow by the use of a supplemental bushing tightly fitted into the threaded end of the pipe and of sufficient length to receive the impact of the steam in passing through the angle at the elbow and thereby to take the wear incidental to such impact, leaving the threaded portion of the pipe in practically its original condition so that when it becomes necessary to remove and replace the worn bushing, the pipe may be more easily unscrewed from the elbow and re-inserted into the elbow with the new bushing therein.

Another object is to make the bushing of slow-corroding material having the portion thereof intermediate its ends normally of slightly greater diameter than the interior of the diameter into which it is to be inserted so that when inserted under high pressure within the pipe, it will be slightly extended lengthwise by the compression of the bulging portion and will cause a tight fitting joint between it and the pipe to further reduce the liability of contact of the steam with the threaded portion of the pipe.

Other objects and uses relating to specific parts of the bushing will be brought out in the following description.

In the drawings:—

Figure 1:
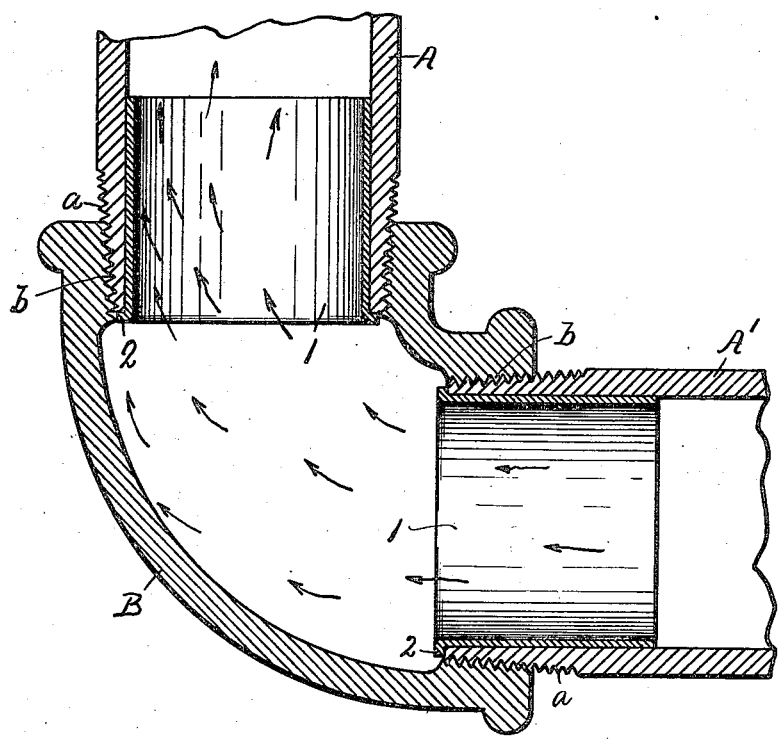
Figure 1 is a longitudinal sectional view of portions of two pipe sections arranged at an angle to each other, and an elbow connecting the same together with my improved bushings in the adjacent ends of both pipe sections.
Figure 2:
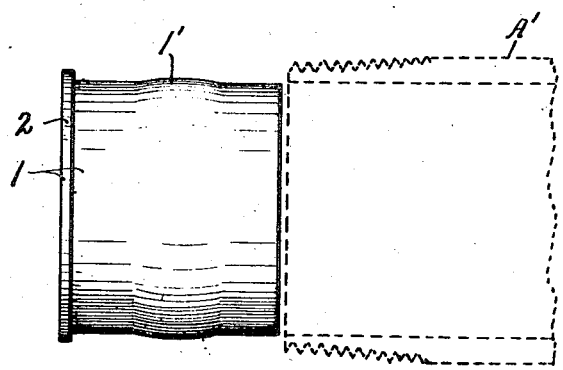
Figure 2 is a side elevation of the detached bushing before being inserted into the pipe section shown by dotted lines.

The externally threaded ends of the two pipe sections as —A— and —A'— are connected by an elbow —B— having internally threaded ends —b— engaging the externally threaded ends —a— of the pipe sections. Within the threaded end of each pipe section is tightly fitted a bushing —1— of relatively thin non-corrodible sheet metal of sufficient length when placed in operative position to receive the impact of the steam or other fluid when passing through the angle at the elbow.

The main body of the bushing is normally swelled or bowed outwardly at —1'— between its ends to a slightly greater diameter than the interior diameter of the pipe in which it is to be inserted so that when forced into the pipe by endwise pressure, it will be slightly extended endwise by inward compression of its bowed sides and will also form a tighter joint with the pipe section than would be possible without previously swelling the bushing in the manner described.

The inner end of the bushing is preferably provided with an annular flange —2— forming a stop shoulder adapted to engage the adjacent end of the pipe section for limiting the endwise movement of the bushing into the pipe, it being understood that the diameter of the flange —2— is slightly less than the external diameter of the adjacent end of the pipe to avoid contact with the threads of the elbow —B—.

The object in showing the bushings in both ends of the pipe sections is to protect the adjacent threaded ends of said sections by the flow of the fluid in either direction as for example, the outflow of the steam in one direction and the backflow of the water condensation in the opposite direction common to steam heating systems.

I have found by actual use that bushings of this character placed in the threaded ends of the pipe sections, particularly, at the elbow connections therewith, renders the pipe sections practically indestructible by protecting their threaded ends from disintegration by corrosion and erosion and also enables them to be more easily removed from the elbow for replacement of the bushings when impaired by erosion or other cause.

It will be evident from the foregoing description that a bushing of this character may be used in the threaded end of any pipe section irrespective of the form of the connection therewith and therefore, I do not wish to limit myself to its use in connection with elbow sections.

What I claim is:

In an apparatus of the character described, the combination with a metallic rigid pipe having a threaded end, of a metallic bushing of less rigidity than the pipe and comprising a relatively short substantially cylindrical part having an intermediate circumferentially expanded portion of a diameter normally greater than the interior diameter of the threaded end of the pipe whereby when the bushing is forced into the pipe, the expanded part is compressed radially and the tubular part is elongated longitudinally to form a tight friction joint between the interior of the pipe and the bushing, and a circumferential flange at the outer end of the bushing in contact with the end of the pipe and limiting the movement of the bushing into the pipe and acting to protect the end of the pipe with which it contacts and which has been weakened by the threading, said flange being of an external diameter not greater than the diameter of the inner surface of the groove formed by the threading.

In witness whereof I have hereunto set my hand this 16th day of April, 1924.

CHAS. E. WIDMEYER.